United States Patent
Drougge

(10) Patent No.: US 9,569,014 B2
(45) Date of Patent: Feb. 14, 2017

(54) COMPUTER MOUSE WITH ADJUSTABLE TOP PART

(71) Applicant: GUNNAR DROUGGE AB, Stockholm (SE)

(72) Inventor: Gunnar Drougge, Stockholm (SE)

(*) Notice: Subject to any disclaimer, the term of this patent is extended or adjusted under 35 U.S.C. 154(b) by 0 days.

(21) Appl. No.: 14/370,271

(22) PCT Filed: Jan. 2, 2013

(86) PCT No.: PCT/SE2013/000001
§ 371 (c)(1),
(2) Date: Jul. 2, 2014

(87) PCT Pub. No.: WO2013/103315
PCT Pub. Date: Jul. 11, 2013

(65) Prior Publication Data
US 2015/0022451 A1    Jan. 22, 2015

(30) Foreign Application Priority Data
Jan. 5, 2012  (SE) ...................................... 1200020

(51) Int. Cl.
*G06F 3/0354*    (2013.01)

(52) U.S. Cl.
CPC ... *G06F 3/03543* (2013.01); *G06F 2203/0333* (2013.01)

(58) Field of Classification Search
CPC .................... G06F 3/03543; G06F 2203/0332; G06F 2203/0333
USPC ..................................................... 345/163–166
See application file for complete search history.

(56) References Cited

U.S. PATENT DOCUMENTS 5,260,696 A * 11/1993 Maynard, Jr. ................. 345/163
5,870,081 A *  2/1999 Wu ............................... 345/163

* cited by examiner

*Primary Examiner* — Michael Pervan
(74) *Attorney, Agent, or Firm* — Luedeka Neely Group, P.C.

(57) ABSTRACT

The invention refers to a computer mouse with an adjustable top part (2). The lock can be tilted around a joint (15) to a chosen rotational position. The computer mouse is equipped with a locking device (12, 13a-b, 16) which locks the top part in the chosen position and the computer mouse is equipped with an unlocking device (13a-b) which enables the locking organ to be released from the locked position. The unlocking device (13a-b) may be a pushbutton (13a) or a handle (13b). In one design of the invention the top part is kept in position by a fastener equipped with teeth (4-5), where the locking device (12, 13a) locks the teeth in a position where they are meshed to each other. In an additional design of the invention the top part is kept in position by a locking device (13b, 16) which grabs the joint so that this cannot be tilted.

2 Claims, 5 Drawing Sheets

COMPUTER MOUSE WITH ADJUSTABLE TOP PART

THE BACKGROUND TO THE INVENTION

Traditional computer mice and corresponding products have a mainly symmetrical, vaulted top part, and a flat bottom surface, which when being used lies against a table top or similar. This would have been suitable if the palm in a non-burdened position lied horizontally, but the palms are tilted towards each other, and the top part of the computer mouse should therefore be tilted accordingly, in order to obtain an ergonomic device. A patent related to computer mice with such design is SE534388, which has a tiltable top part, which can be tilted to the chosen position in order to fit the hand of the user.

The top part might, if the user grabs the computer mouse at the top part in order to move the mouse, unintentionally open up another step or more compared to the position in which the top part previously was, or reach an end position where the top part closes. If the computer mouse is lifted from the ground, the weight of the bottom part itself might cause the top part to open up, especially if the computer mouse is equipped with a cord to the computer.

One purpose of the invention is therefore to provide a computer mouse with an adjustable top part, which prevents that the top part of the mouse unintentionally changes its positions when being used.

These and other purposes are achieved through a computer mouse with an adjustable top part according to the characteristic parts of the independent demand.

SUMMARY OF THE INVENTION

The invention refers to a computer mouse with one relative to a bottom part 1, adjustable top part 2. The top part can be tilted around a joint 15 to a chosen tilted position. The computer mouse is in a beneficial way equipped with a locking device 12, 13*a-b*, 16 which locks the top part in the chosen position and the computer mouse is equipped with an unlocking device 13*a-b* which enables the locking device to be unlocked from the locked position. The unlocking device 13*a-b* may be a pushbutton 13*a* or a handle 13*b*.

In a particularly beneficial design of the invention the top part is kept in its position by a fastener 3-5 2 equipped with teeth 4-5, where the locking device 12, 13*a* locks the teeth in a position where they are meshed to each other.

In another beneficial design of the invention the top part is kept in its position by a locking device 13*b*, 16 which grabs the joint so that it cannot be tilted.

A BRIEF DESCRIPTION OF THE FIGURES

Figure 1:
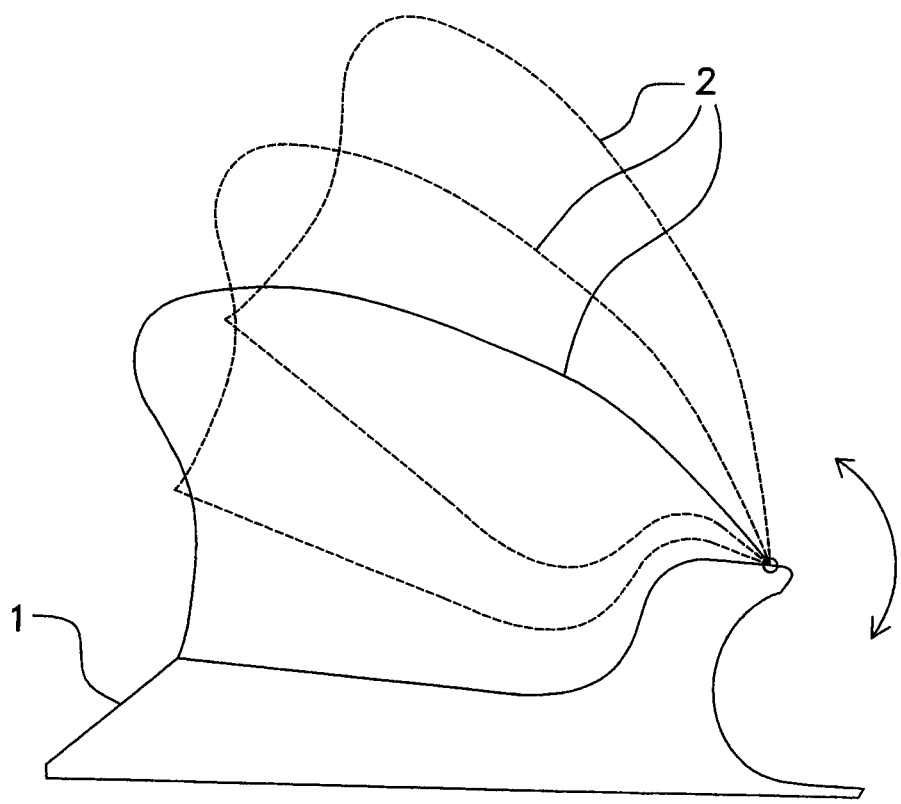
Figure 2:
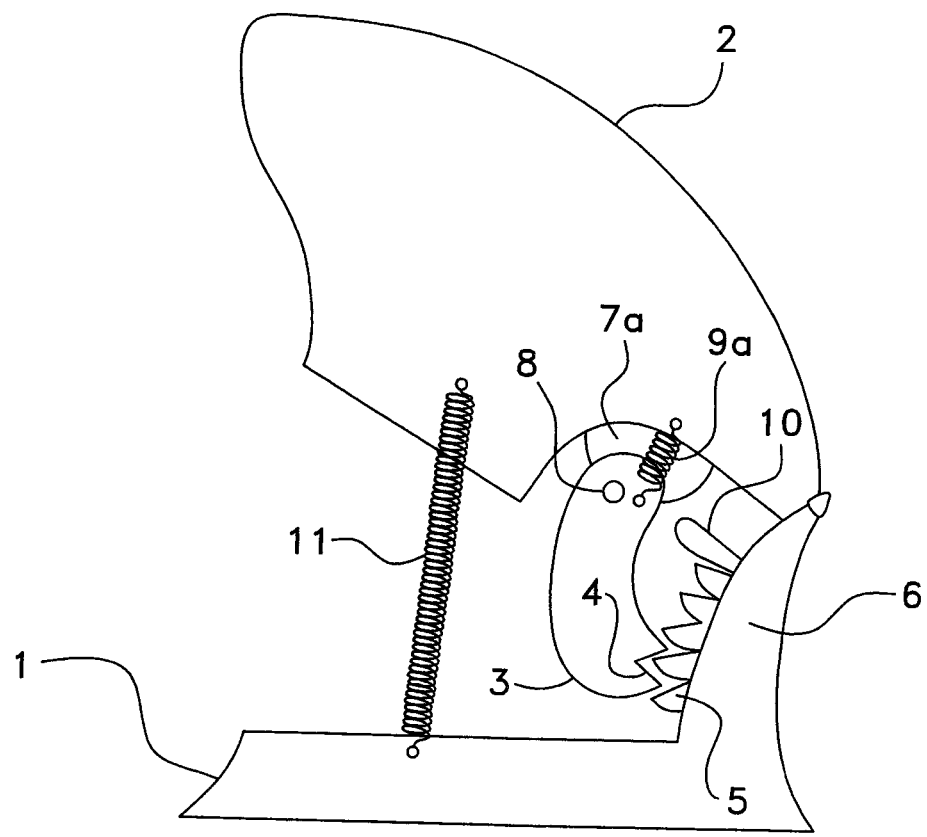
Figure 3:
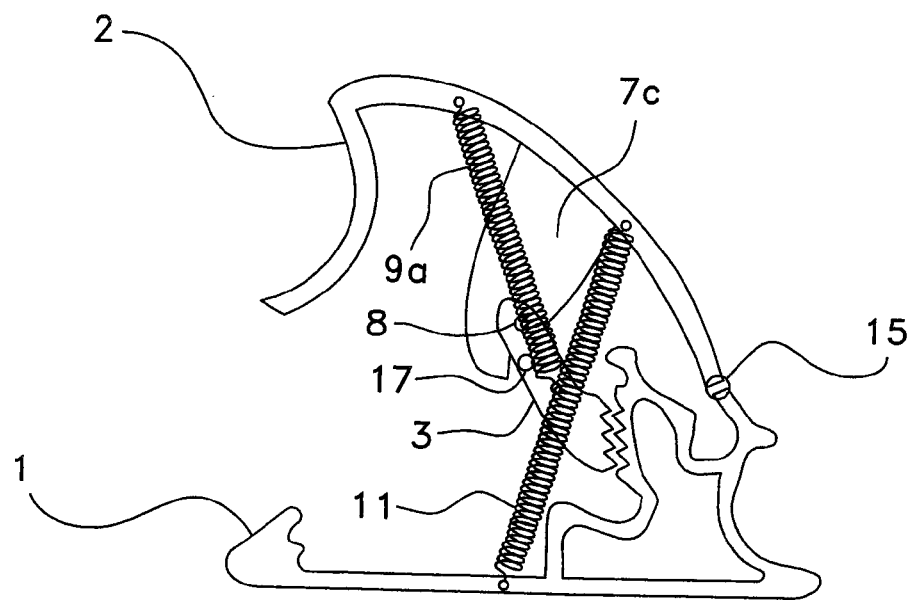
Figure 4:
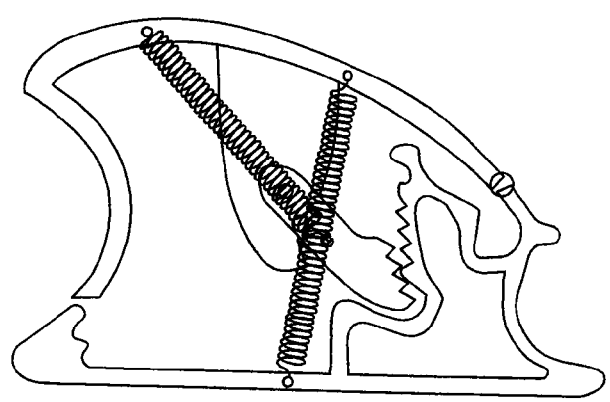
Figure 5:
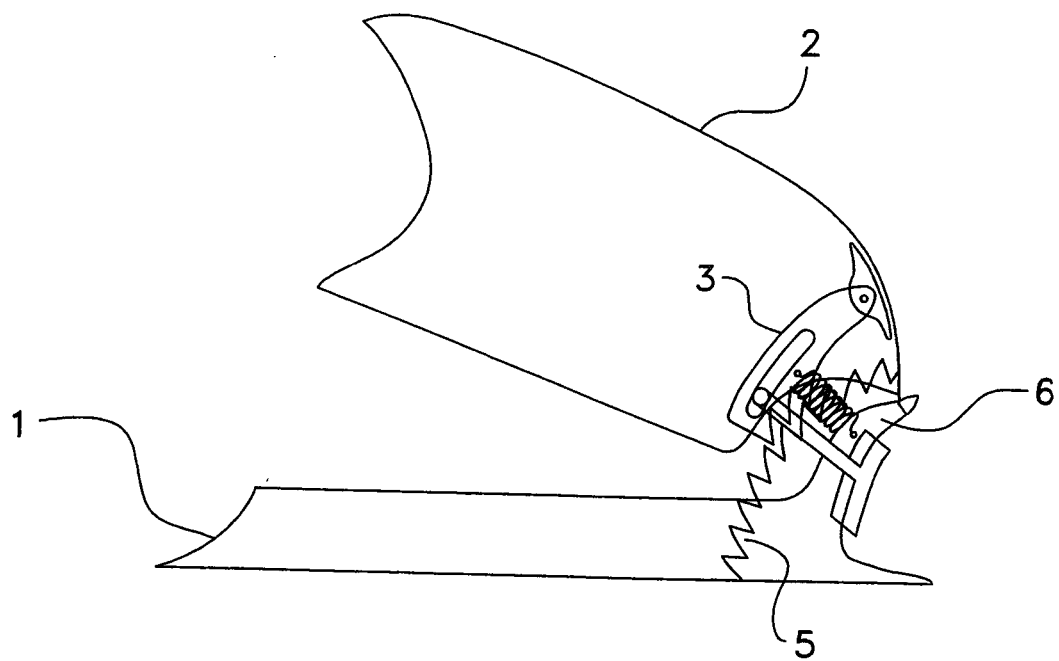
Figure 6:
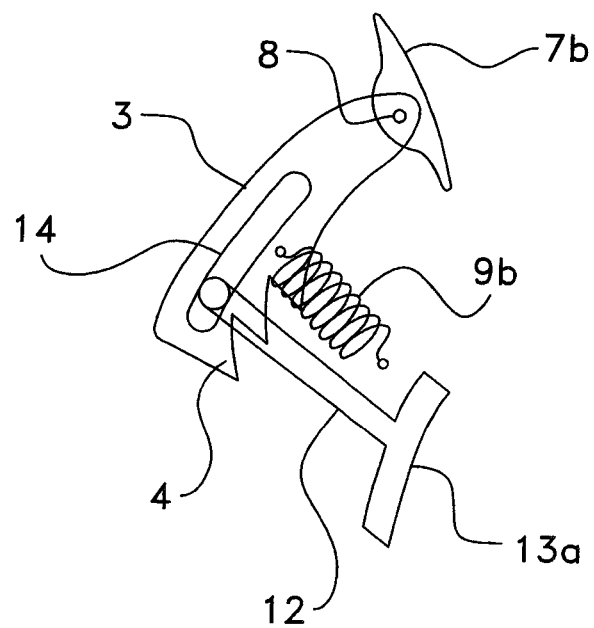
Figure 7:
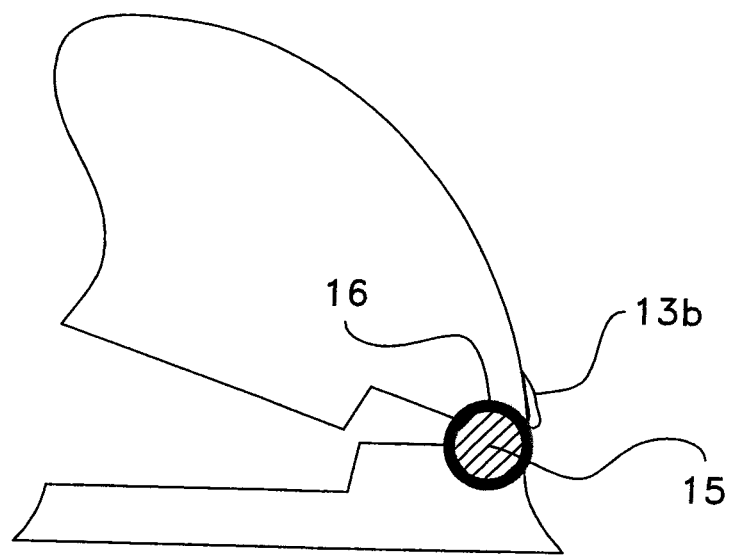
Figure 8:
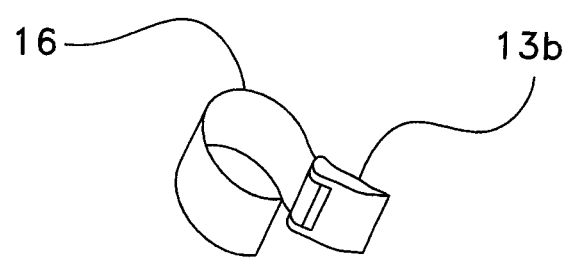

FIG. 1 shows in cross section a computer mouse according to known technology in three different positions FIG. 2 shows in cross section a computer mouse according to known technology in greater detail FIG. 3 shows in cross section a second design of a computer mouse according to known technology in an open position FIG. 4 shows in cross section the second design of the computer mouse according to known technology in a closed position FIG. 5 shows in cross section a first design of a computer mouse according to the invention FIG. 6 shows in greater detail parts of the first design of the computer mouse FIG. 7 shows in a partial cross section a second design of a computer mouse according to the invention FIG. 8 shows in greater detail parts of the second design of the computer mouse

DESCRIPTION OF THE PREFERRED DESIGNS

FIG. 1 shows in cross section a computer mouse according to known technology with a top part in a closed, half open and in fully open position. The computer mouse is illustrated in a cross section which ranges perpendicular through the longitudinal axis along which at usage the hand of the user stretches, thus perpendicular to the axis which ranges from the end that emanates from the user to the end that faces the user.

The computer mouse has a bottom part 1 with a projecting left part on which the user's thumb can rest and a projecting right part with a sinking, in which the little finger is placed at usage. The computer mouse has a tiltable top part 2 which is illustrated in three different positions; where the top part in a fully closed position is illustrated by a solid line while the top part in partly- and fully 3 open positions respectively are illustrated by dotted lines.

The top is tiltably attached along the upper left side of the computer mouse with a hinge-like device, so that it can be tilted upwards and clockwise to a chosen degree. In the interior of the computer mouse there are non-illustrated components, which keep the top part at the chosen degree of opening, which will be described more closely in the description below. Since the top part of the computer mouse can be opened in this way, the hand is allowed to rest towards the top part of the computer mouse in a way which is better adapted to the position a hand normally holds since the palm in a non-tensed position is angled from a totally horizontal position. Since the top part is adjustable the user is allowed to choose an individually suitable angle of the palm.

FIG. 2 shows in cross section a computer mouse according to known technology in greater detail, with the top part 1 in a partly raised position. The top part is kept in a raised position by an arm 3 with teeth 4 which interact with teeth 5 arranged on the inside of the bottom part 1 of the computer mouse. The bottom part of the computer mouse has on its right side a part 6 which stretches upwards towards the top part and the bottom part has a left side which stretches upwards where the teeth of the bottom part 5 are arranged. The upward stretching part 6 has a bent shape which bends towards the left in the figure in order to match the arm's rotating movement so that the teeth interlocks in the most beneficial way.

The top part has a lower surface, which match the bottom part with a lower left part and an upwards sunk right part which receives the upwards stretching part 6 of the bottom part. The arm is arranged in the right upwards sunk part of the top part and is attached in a way so that it can swivel there by an attaching part 7. The arm is tiltably attached to the attached part 7*a* around a rotation axis 8. The axis is further connected to the top part by an arm spring 9*a* which is connected to the arm at a point to the right of the axis, so that the spring strives to the right and forces the teeth of the arm 4 to interlock with the teeth 5 of the bottom part.

The teeth of the arm can interact with the teeth of the bottom part with the top part in a number of different degrees of opening defined by the teeth. Above the top part tooth in the row of teeth of the bottom part is a projecting unit 10 which stretches further away from the upwards stretching part of the bottom part 6 than the teeth When the top part is opened widely enough the arm reaches this projecting unit and is through this forced out from the teeth of the bottom part.

The top part is connected to the bottom part by a closure spring 11 which strives to close the computer mouse by forcing the top part towards the bottom part. With the arm in position for the teeth of the arm to interact with the teeth of the bottom part this is prevented and the top part remains in its position. When the top part has been pushed up to a level 4 where the arm is driven away from the teeth of the bottom part of the projecting unit 10, the closure spring however can quickly close the top part before the arm reaches the teeth of the bottom part. In this way the top part can be gradually opened to a maximum open position where the top part afterwards closes.

The disadvantage with the construction is that if the user grabs the top part of the computer mouse in order to move the mouse, the top part can unintentionally open one or more steps further than the position in which the top part previously was attached to, or reach the end position where the top part is closed. If the computer mouse is lifted from the ground the weight of the bottom part in itself might cause the top part to open, especially if the computer mouse is equipped with a cord to the computer. This is the unwanted effect which the invention is intended to solve.

FIG. 3 shows in cross section a second design of a computer mouse according to known technology in an open position while FIG. 4 shows in cross section the same design of the computer mouse in closed position. Also this design of the computer mouse has a top part 2 and a bottom part with an outer contour similar to those according to known technology in the field. Also here the top part can be tilted up relative to the bottom part along a joint 15 which in this figure is clearly illustrated. The top part is closed in a position relative to the bottom part by a castellated arm 3 which is tiltably attached to an attached part 7c which stretches downwards from the inside of the top part. The teeth of the arm interact with the corresponding teeth on an upwards stretching part 6 of the bottom part.

Above the teeth of the upwards stretching part 6 is a projecting unit 10 which secures that the arm disengages when the top part has reached an uppermost position and by this the top part can be drawn down to its lowermost position. The arm is kept normally pressed towards the teeth of the bottom part 5 of the arm spring 9a since this normally stretches itself to the right of the rotation axis 8, but when the arm has reached the projecting unit 10 the arm is forced so far from the teeth of the bottom part, to the left in the figure, so that the spring stretches itself to the left of the rotation axis and causes the arm to be pulled to the left and to disengage from the teeth of the bottom part. The movement to the left is limited by a stop 17, so that the arm when it is most tilted from the teeth of the bottom part still stretches obliquely downwards to the right.

With the arm pulled maximum left the top part can be brought down so that the arm's teeth end up in height with the lowermost teeth of the bottom part but without being meshed to these. When the top part then approaches its lowermost position the arm touches the bottom which forces it so far to the right that the teeth end up meshed to each other. In this movement the arm spring 9a reaches a position where it once again stretches to the right of the rotation axis 8 and forces the arm to the right so that the teeth's mesh to each other remains.

The top part strives downwards towards the bottom part and is forced all the way down towards it when the arm has been disengaged either through the effect of a closure spring 11 which stretches between the top part and the bottom part. If the computer mouse is lifted in the top part the seal spring 11 keeps the top part in the position relative to the bottom part which is defined by the position of the arm's teeth. The arm's teeth are pushed against the teeth of the bottom part by an arm spring 9a corresponding to the one in the first design according to known technology.

FIG. 5 shows in cross section a first design of a computer mouse according the invention which in the same way as computer mice according to known technology has a top part 2 and a bottom part 1, where in the figure the top part is illustrated in a partly raised position. The bottom part of the computer mouse 1 has a correspondingly projecting left part against which the user's thumb can rest and a projecting right part with a sinking in which the user's little finger is placed when using. The top part 2 is tiltable in the same way as computer mice according to known technology, with a non-illustrated hinge-like unit at the right edge of the top part.

The top part can be locked at a desired degree of angulation by internal construction details which are more clearly illustrated and enlarged in FIG. 6, so the construction of the first design of the computer mouse is described below with references both to FIGS. 5 and 6. The top part is kept in a partly raised position by an arm 3 with teeth 4 which interact with teeth 5 arranged on the inside of the bottom part of the computer mouse. The bottom part of the computer mouse has on its right side an upwards stretching part 6 and this part has a left side where the teeth of the bottom part 5 are arranged. The upwards stretching part 6 has a bent shape which bends to the left in the figure to match the rotating movements of the arm so that the teeth interlock in the best way.

The axis is connected to the upwards stretching part 6 on the bottom part by an arm spring 9b, so that the spring strives towards the right and forces the teeth of the arm 4 into the teeth of the bottom part 5. The spring has such a powerful spring force that even when the computer mouse is lifted in the top part, the teeth remain engaged with each other and the position of the top part relative to the bottom part remains unchanged.

The arm is tiltably attached to the top part by an attached part 7b, where the arm can rotate around an axis 8 on the attached part. The arm spring 9b normally holds the arm's teeth in conjunction with the teeth of the bottom part, so that the arm cannot be tilted around the axis, but the computer mouse is equipped with an unlocking device which can force the teeth of the arm to disengage from the teeth of the bottom part so that the top part can be tilted to the desired position. From the outside of the upwards stretching part 6 of the bottom part, that is its outside, stretches an unlocking arm 12 to the arm 3, which can push the arm out of the locked position.

The unlocking arm 12 has a pushbutton 13a at the end of the unlocking arm which is arranged furthest from the arm 3, and this pushbutton 13a stretches along the upwards stretching part's 6 outside. Under the pushbutton on the upwards stretching part's 6 outside is a sinking, which allows the button to be pressed in, and the unlocking arm then forces the arm to disengage.

The unlocking arm stretches itself to the arm and reaches a track 14, which stretches along the elongated arm's middle along its longitudinal extent. The unlocking arm is slidingly attached to the track so that the arm can move relative to the unlocking arm, but the unlocking arm cannot entirely leave the arm.

FIG. 7 shows in a partial cross section a second design of a computer mouse according to the invention. The second design describes a computer mouse with similar outer contour and correspondingly tiltable top part as in the first design and in the here previously illustrated 6 designs of computer mice according to known technology. The top part is connected to the bottom part by a joint 15, but the joint is surrounded by an openable circlip 16. The circlip grabs with force around the joint and locks it in the chosen position. Internally the computer mouse may include an arm with teeth in the same way as before, but this is no longer necessary since the circlip can lock the joint in any locked position. For additional steadiness it might however be appropriate if the computer mouse in addition has a castellated arm with associated device. The circlip can be locked in position so that it grabs around the joint with a locking bracket 13b and by turning up the locking bracket the circlip is unlocked so that the position of the lock can be altered.

FIG. 8 shows in greater detail the circlip 16 with the locking bracket 13b. The circlip consists of a band which in an unloaded position stretches along a part of a circle. The band is at one end attached to a tiltable locking bracket and the locking bracket can receive the band's other attachment. With the band's other attachment received in the locking bracket, the locking bracket can be tilted relative to the closed ring which the band then forms, in such a way that the band tightens and the circumference of the ring decreases.

With the band arranged around the joint 15, the components of the joint are compressed so that they are prohibited to move relative each other. The joint then prevents the top part from moving relative to the bottom part and the locking bracket lies firmly along the outside of the top part. The locking bracket springs to this position, but can by a user be forced out from the top part so that the circlip releases its grip on the joint.

The circlip which is described in connection to the second design can of course be applied to other designs and can for example be used with the computer mouse of known technology which is illustrated in the FIGS. 3-4. The two illustrated designs are obviously only examples, but have in common that the top part is kept in the chosen position until an action is taken which releases a locking feature, here by the pressing of a button or by tilting up a locking bracket. Other designs are of course thinkable, where the top part is locked in position by some other mechanism which then can be released by a chosen device. The illustrated designs concerns what here for simplicity is called computer mouse and the same terminology is used in the patent claims, but obviously is here by this expression meant which device that specifies a position for a computer which preferably totally independent of which type of device that actually is equipped with an adjustable top part with locking.

The invention claimed is:

1. A computer mouse with one relative to a bottom part (1) adjustable top part (2), where the top part is operable to be tilted around a joint (15) to a chosen rotational position, where the mouse is equipped with a locking device (12, 13a-b, 16) which locks the top part in a chosen position and where the computer mouse is equipped with an unlocking device (13a-b) which enables the locking device to be released from a locked position, characterized by that the locking device (13b, 16) in its locked position grabs the joint, applying a substantially circularly symmetric radially directed force on the joint for preventing the joint from rotating.

2. A computer mouse according to claim 1 characterized by that the unlocking device (13a-b) consists of a handle (13b).

* * * * *